United States Patent
Assembergs

[11] 3,884,262
[45] May 20, 1975

[54] PRESSURE CONTROL DEVICE FOR A HYDRAULIC CIRCUIT

[75] Inventor: Carl J. Assembergs, Alzano Lombardo, Italy

[73] Assignee: Koppen & Lethem Trading Co. A.G., Zug, Switzerland

[22] Filed: July 11, 1973

[21] Appl. No.: 378,078

Related U.S. Application Data

[63] Continuation of Ser. No. 178,200, Sept. 7, 1971, abandoned.

[30] Foreign Application Priority Data

Sept. 11, 1970 Netherlands.................... 7013477

[52] U.S. Cl................................ 137/489; 137/115
[51] Int. Cl............................................ F16k 17/06
[58] Field of Search ........ 137/115, 116, 116.3, 489, 137/491; 60/468

[56] References Cited
UNITED STATES PATENTS

| | | |
|---|---|---|
| 2,815,714 | 12/1957 | Jacobsen...................... 137/115 X |
| 2,984,251 | 5/1961 | Quinby ............................ 137/116.3 |
| 3,279,558 | 10/1966 | Allen et al. ...................... 137/115 X |
| 3,411,531 | 11/1968 | Clark et al........................... 137/491 |
| 3,613,717 | 10/1971 | Smith................................... 137/491 |

FOREIGN PATENTS OR APPLICATIONS

1,168,195   4/1964   Germany.................... 137/115

*Primary Examiner*—Robert G. Nilson
*Attorney, Agent, or Firm*—Depaoli & O'Brien

[57] ABSTRACT

A pressure control device in which a throttle passage inter-connecting inlet and return pump channels is selectively opened by a control slide having one end pressurized with hydraulic fluid at pump pressure and the other end pressurized with a light spring plus a balance pressure produced by incoming hydraulic fluid selectively throttled down from pump pressure controlled by a valve means in response to a magnetically set hydraulic pressure.

11 Claims, 5 Drawing Figures

PRESSURE CONTROL DEVICE FOR A HYDRAULIC CIRCUIT

This is a continuation of application Ser. No. 178,200, filed Sept. 7, 1971, and now abandoned.

This invention relates to pressure regulators and more particularly relates to variable-demand pressure regulators for multi-cycle hydraulic consumers. It especially relates to pressure control devices having an electrically actuated hydraulic control means.

Pressure control devices of this type are generally known and are widely used for all possible devices, e.g. the control of the system pressure of the hydrualic device for moving the slide in machine tools, the limiting of the maximum allowable operating pressure during the pressurizing of hydrualic pressure cylinders of a hydraulic press, the limiting of the maximum allowable load which may be lifted by a hydraulic fork lift truck, etc.

In such a pressure control device, the system pressure is controlled directly or indirectly by the mechanical adjustment of a spring pressure. The higher the spring tension, the higher the maximal system pressure. In practice, however, it frequently occurs that maximum operating pressures are required for various movements. This is the case, for instance, in plastic injection moulding machines.

It frequently occurs during one operating cycle of a plastic injection moulding machine the pressure has to be limited to four different values, e.g., in one cycle there must be a closing pressure of 160 $kp/cm^2$, an injection pressure of 100 $kp/cm^2$, a lower injection pressure of 60 $kp/cm^2$ and a mould protection pressure of 15 $kp/cm^2$. In this example, consequently, four different pressure limiting valves are required.

In most cases, additional magnet valves are incorporated for this purpose in the hydraulic system. These additional valves have the task of connecting at the appropriate moment on electrical command one of the pressure limiting valves to the hydraulic circuit and simultaneously shutting off the other pressure control valves of the hydraulic circuit which are present in the system.

In the above example, consequently, in addition to four differently adjusted pressure control valves and one pressure control valve for protecting the pump against overloading, there are also two required magnet valves with three positions and four channels which, in the open position connect all four pressure control valves with the reservoir and which, dependent on the energization of one of the magnets, are each capable of throughconnecting one of the pressure control valves with the circuit, as a result of which the operating pressure of the system is limited to the set value of the pressure control valve in question.

Mostly such plastic injection moulding machines work fully automatically according to a programmed cycle. If on such a machine a change of product must take place, not only the set program must be changed but also the additional pressure control valves present in the hydraulic system must be reset.

Because the setting of these pressures can only be effected during the traversing of the various phases, this is a time-consuming matter, the setting of these pressures also cannot be programmed.

With the pressure control device according to the invention, any desired operating pressure between zero and maximum is remotely controllable electrically, viz. in direct dependence on the electric current. As at a specific voltage the same maximum operating pressure is always set, the pressure control is reproducible and, consequently, programmable. Moreover, e.g. in comparison with the four pressure control valves and the two magnet control valves according to the previous example, only a single pressure control valve is required which also serves as protection of the pump against overloading.

To this effect the pressure control device according to the invention is characterized in that the spring pressure adjusting means comprise hydraulically controlled piston means, which hydraulic pressure springs from the pressure medium, conducted via a throttle passage, originating from the pump, which throttle passage is formed by a control slide mechanism functioning as a pressure reducing valve, whose control slide is controlled by a size-adjustable pressure force working against spring pressure and reduced medium pressure.

By way of example, embodiments according to the invention will be described hereunder as they are shown on the drawing.

FIG. 3 Part A is a schematic drawing of the pressure control device according to FIG. 1, incorporated in a complete hydraulic system;

FIG. 3 Part B is a schematic drawing of the pressure control device as shown in FIG. 2, incorporated in the same complete hydraulic system;

Figure 1:
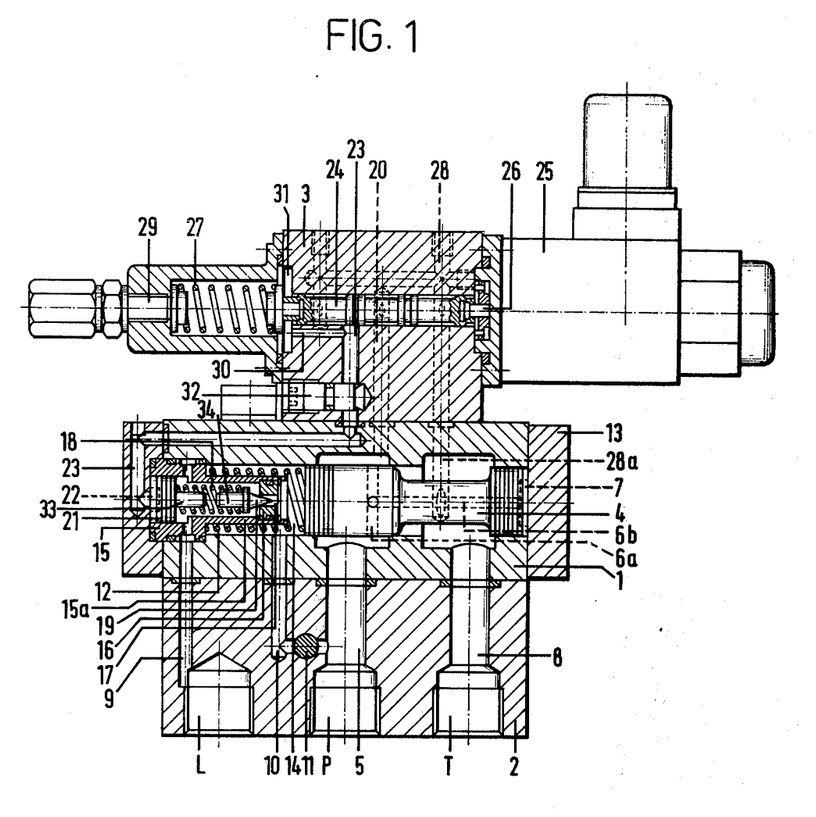
FIG. 1 is a cross section of a pressure control device for the stepless control and setting of the system pressure.

The pressure control device as shown in FIG. 1, in addition to protecting the hydraulic system as a whole, has also the task of electrically limiting the operating pressure required for each separate consumer to the value of the maximum allowable pressure for the whole system.

Figure 2:
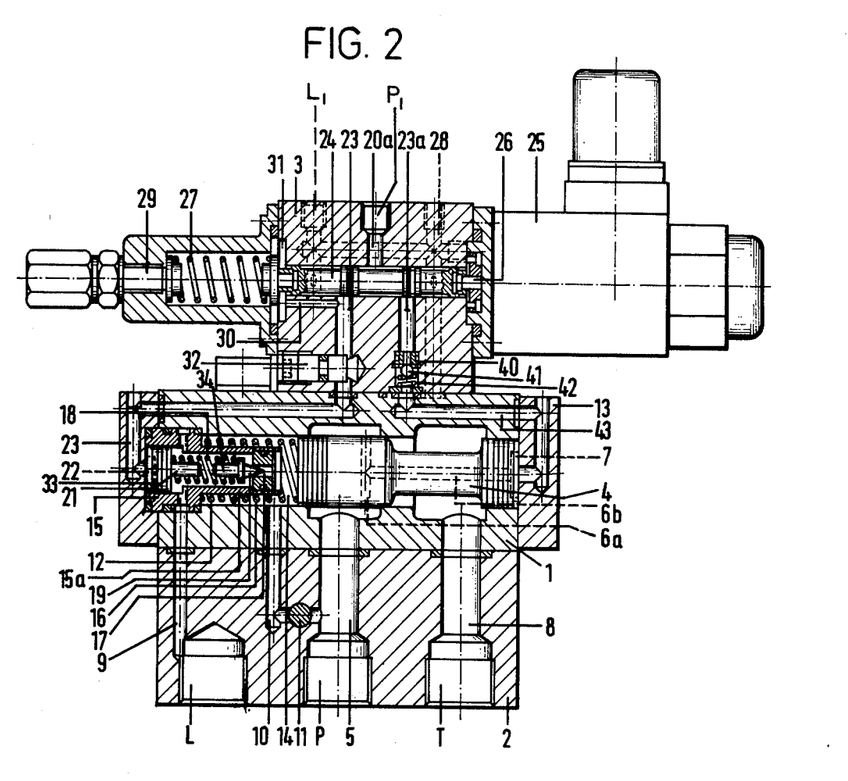
FIG. 2 is a cross section of a pressure control device as variant of the embodiment shown in FIG. 1.

The pressure control device as shown in FIG. 2 has the task, with respect to maintenance of all parts of the pressure control device as shown in FIG. 1, of building up a counter pressure which is also controllable and settable electrically, simply by addition of one additional control bore and a built-in nonreturn valve.

Figure 3:
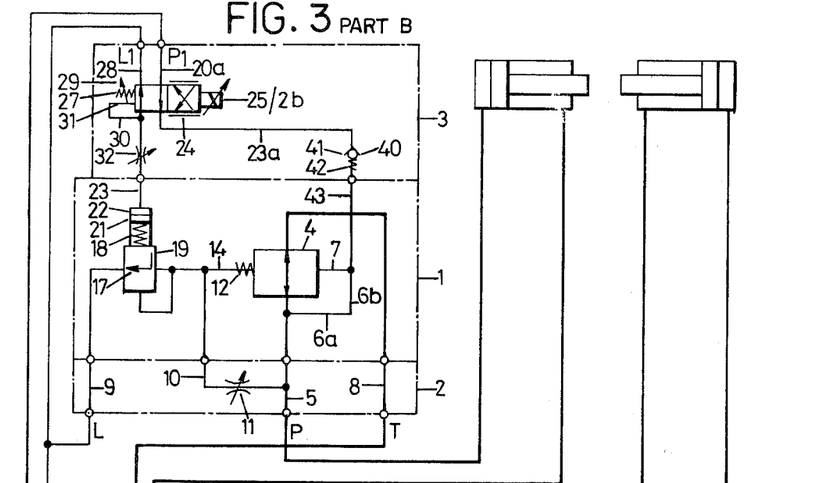

Both pressure control devices are incorporated, in keeping with symbols conventional in hydraulics, in a hydraulic diagram (FIG. 3 Parts A and B), the pump P providing the required oil for effecting movements through, and for operating at the desired pressure of, two hydraulic pressure cylinders which are controlled by two conventional magnetic slides, the pressure control device as shown in FIG. 3 Part A (representing the pressure control device shown in FIG. 1) determining the maximum allowable system pressure, while also allowing the maximum operating pressure for each separate movement of the two cylinders to be set.

The pressure control device as shown in FIG. 3 Part B (representing the pressure control device shown in FIG. 2) controls the counterpressure of one of the hydraulic pressure cylinders when this has to be pressed in against a specific resistance become of full extension of the second hydraulic pressure cylinder.

As shown in FIG. 1, the electrical control device comprises a pressure balance valve 1, a bottom plate 2 and a magnet-energized pressure reducing valve 3.

The pressure balance valve 1 comprises a control plunger functioning as the pressure balance slide 4 which, against the action of a light spring 12 in the housing is axially movable to the left (in the figure). This pressure balance slide 4 is provided with a radial control bore 6a which opens into axial control bore 6b, centrally disposed in the slide 4. The latter bore has an outlet opposite closure cap 13.

Via pump channel 5 and cover-plate port P in the bottom plate 2, the control bores 6a and 6b are in continuous communication with the pressure pipe which is delivering hydraulic fluid to the cylinder being operated such as in a hydraulic press. The pressure space 14 at the springloaded side of pressure balance slide 4 is also in continuous communication via pressure bore 10 with the pump channel 5 and so with the pressure pipe. In the pressure bore 10 there is disposed a throttle-screw 11 which can close off the passage in bore 10 optionally to a lesser or greater degree, thereby changing the rate of pressure build-up in space 14.

In FIG. 1, at the left side of the pressure balance valve 1, is disposed the pressure-limiting valve assembly 15. This assembly 15 comprises a valve seat 16 with an adjusting bore 17, a valve cone 19 shutting off this bore 17 which is pressed onto the seat 16 through a spring 18, a housing 15a and a control plunger 21 which is axially slidable in said housing. On the control plunger 21, and a pin 34 is attached to the valve cone 19. The oppositely disposed pins 33, 34 slideably support the pressure spring 18.

The space wherein the pressure spring 18 is disposed is in continuous communication, via leak-off bore 9 and leak-off port L in the bottom plate 2, with a leak-off pipe which again is connected with the reservoir. The pressure chamber 22 in FIG. 1 at the left of plunger 21 is in communication via control bore 23 with the magnetically energized pressure reducing valve 3.

The magnetically energized pressure reducing valve 3 comprises a housing wherein is disposed a small control slide 24 slidable. In FIG. 1, the pressure reducing valve 3 is provided with an electric magnet 25, whose armature space is shut off air-tight and which is movable to the left in FIG. 1 by energizing the armature 26.

Armature 26 engages the control slide 24 of the pressure reducing valve 3. Against the action of a control spring 27, the control slide 24 is moved to the left by energization of magnet 25, as a result of which a throttle point between feed bore 20, which opens into the central pump channel 5, and channel 23 can be controlled. When magnet 25 is de-energized, control spring 27 presses control slide 24 again to the right, so that the control bore 23 communicates via return bores 28 and 28a with the return channel 8 and via the latter and port T with the reservoir.

The tension of control spring 27 can be changed by means of control screw 29. The bore 23 is in continuous communication via auxiliary bore 30 with the pressure space 31 at the left of control slide 24.

The above-described control device functions as follows:

If magnet 25 is still de-energized, and the pump is started, then the pumped oil will stream via port P and channel 5 into the bores 6a and 6b, and therefrom into pressure space 7. Thus the pressure balance slide 4 at the side of the closure cap 13 is loaded with the pump pressure. The pump oil also moves, via pressure bore 10, into the pressure space 14 at the spring-loaded end of pressure balance slide 4. As spring 18 is still lightly compressed, the valve cone 19 presses lightly on valve seat 16, so that oil from the pressure space 14, via bore 17 of the valve seat 16 and via leak-off bore 9 leak-off, port L and the leak-off line, escapes to the reservoir. The throttle screw 11 in pressure bore 10 ensures that the volume which passes is only slight. In this manner its pressure balance slide 4 is relieved at the spring-loaded spring end.

Thus the pressure balance slide 4 is pressed to the left against the action of spring 12, according to FIG. 1, thus releasing the connection between pump channel 5 and return channel 8. If the magnet 25 is de-energized, an oil circulation takes place from pump to reservoir, namely at a circulation pressure as determined by the tension of spring 12. In practice, this spring tension will be chosen as low as possible, e.g. corresponding with a pressure of 2 kp/cm$^2$. If the magnet 25 is energized simultaneously with energization of a control valve for engaging a consumer, a force is exerted by the armature 26 on the control slide 24 of the pressure reducing valve 3. According to the magnitude of the flux this force on the control slide 24 is smaller or greater, and with an uncharged magnet, it is equal to zero. The force exerted by the armature 26 on the control slide 24 causes the latter to move to the left against the action of the control spring 27 and the oil pressure in pressure space 31. As the result of this, a throttle slot between the bore 20 which is in open communication with the central pump channel 5, and control bore 23 is opened, and simultaneously the connection between control bore 23 and return bore 28, which is in communication with the central return channel 8, is shut off, thus causing the control oil to flow from bore 20 into the control bore 23, with build-up of control pressure in the latter bore.

As the auxiliary bore 30 provides a continuous connection between the control bore 23 and the pressure space 31, there acts on the right side of control slide 24 the force exerted by the magnet armature 26 when magnet 25 is energized and on the opposite side the pressure in the control bore 23 plus the pressure force caused by the pressure of spring 27.

Thus the control slide 24 attains an equilibrium condition, the pressure in the control bore 23 being consequently determined in direct relation with the magnetic flux. With increase of the magnetic flux the force of the magnet armature 26 on the control slide 24 moves it further to the left, so that further control oil can enter bore 23. The movement of the control slide 24 is maintained until the pressure in control bore 23, together with the tension of spring 27, is again equal to the force exerted by the magnet armature on the In this manner it is possible to reduce excessive and variable pump pressure that typically occurs during the operation of a consumer to a constant control pressure in the control bore 23 according to the magnetic flux that is set.

The control bore 23 opens into the pressure chamber 22, so that via this control bore 23, control pressure, therewithin can be exerted on the control plunger 21 to move it to the right, the spring 18 positioned behind the control plunger 21 being compressed. As this spring 18 exerts a force in its turn on the shoulder of valve cone 19, the latter is more strongly pressed onto the seat 16, thus closing off the bore 17 of seat 16. The oil in the space 14, consequently, can no longer escape and thus pressure is built up also at the springloaded side of pressure balance slide 4. Through the combination of increasing pressure and the spring tension of spring 12, the pressure balance slide 4 is moved to the right, the passage between channel 5 and channel 8 being shut off.

The pressure in the pressure pipe then increases to a value as required for performing a movement through a consumer energized for functioning via a control valve. When higher counter-pressure is encountered, the pump pressure also increases accordingly. The counter-pressure encountered, however, can become so high that the valve cone 19, against the force of the pressure spring 18, is lifted from the seat 16 by the higher pump pressure.

This causes the oil to flow from the pressure space 14, via bore 17 of valve seat 16, to the channel 9 and the port L, and subsequently to the reservoir. Thus the pressure in pressure space 14, which is also the pressure on the springloaded side of the pressure balance slide 4, is kept constant, there being a pressure drop across the throttle screw 11. At the opposite side of the pressure balance slide 4, however, the pump pressure can increase in accordance with this increase in counter-pressure, as result of which the pressure balance slide 4 is moved to the left, thus opening the passage between pump channel 5 and return channel 8 until the pump pressure is equal to the pressure in the pressure space 14 increased by the spring force of the spring 12.

In this manner the maximum permissible system pressure is limited. It will be clear that a change in spring tension of pressure spring 18 produces a change of the maximum system pressure. This spring tension again is a function of the control pressure on control plunger 21 and as the control pressure again is determined by the magnetic flux on magnet 25, the maximum system pressure is dependent on the magnetic flux.

Consequently, the system pressure for each separate working movement cycle can be influenced electrically by means of electric resistors, potentiometers and the like, and can also be programmed with advantage.

The passage of control bore 23 can be influenced by the throttle screw 32, and therewith the oil volume passing therethrough per unit of time. By throttling this passage to a greater or lesser degree, the switching speed of the control plunger 21 can be set. Because the pre-control pressure, determined by the flux on magnet 25, is always constant, the speed set by the throttle screw 32, by which the pressure changes are produced, is similarly constant.

The throttle screw 11 has the function of varying the size of the bore 10. By increasing or reducing the passage, more or less oil can pass per unit of time, as a result of which the speed of pressure build-up and pressure drop during the actuation of a consumer can be regulated.

It will be clear that it is not necessary to provide the pressure balance slide 4 with the internal control bores 6a and 6b in order to balance the slide 4. For instance, a set of auxiliary bores can be applied with the same result in the housing of the pressure balance valve 1, via which pump oil from the central pump channel 5 can attain the side of pressure balance slide 4 lying opposite the spring 12.

FIG. 3 Part A illustrates the above described functioning by means of a hydraulic diagram, use being made as much as possible of international symbols.

FIG. 2 shows a variant of the embodiment shown in FIG. 1. The pressure control device shown in FIG. 2 is connected between a consuming means and a control valve controlling said consuming means. The pressure control device, with de-energized magnet, permits the oil to freely pass from port P to port T and vice versa. After energizing the magnet 25, the same pressure build-up and pressure control takes place as described for the pressure control device shown in FIG. 1.

The pressure control device shown in FIG. 2 has a completely identical build-up and comprises the same components; however, the bore 20 is absent, and instead a bore 20a is connected with a port P1 which via a separate pipe (not shown) is throughconnected with the pump and a separate leak connection L1.

Furthermore, a bore 23a is present in the pressure reducing valve 3. This bore 23a continues inside the pressure balance valve 1 in a bore 43, which opens into the central bore for the pressure balance slide 4, namely at the side opposite the pressure spring 12. In bore 23a is disposed a non-return valve comprising a seat 40, a shut-off ball 41 and a pressure spring 42.

The functioning of the pressure control device as schematically shown in FIG. 3 Part B is the following:

If the magnet 25 is still de-energized and, as shown in FIG. 3 Part B, the left control slide is disposed in an operable condition, so that oil flows from the port P to the port T, then oil will stream via control port P1 into the bore 20a. Spring 27 presses the control slide 24, with magnet 25 being unenergized, fully to the right against the armature of the magnet 25. In this position the control slide 24 connects the bore 23 with the return bore 28. As already shown in FIG. 1, this relieves the control plunger 21. At the same time, in this position of the control slide 24, the control bore 20a is connected with the bore 43, via bore 23a. The system pressure therefore will be full on the pressure balance slide 4 at the side of the closure cap 13, while the other side is relieved. Consequently, the pressure balance slide 4, in FIG. 2, is pressed fully to the left, thus fully opening the connection between port P and port T.

As port P1 is in direct communication with the pump, it is irrelevant whether the oil flows from P to T, or vice versa from T to P, without pressure drop.

As soon as the magnet 25 in FIG. 2 is energized, the control slide 24 fully moves to the left as described in FIG. 1, and oil streams from bore 20a into the control bore 23. At the same time the control slide 24 closes off the connection between feed bore 20a and control bore 23a, so that no more pump oil can enter channel 43.

Now it has to be avoided that oil entering bore 43 via channel 5 and control bores 6a and 6b can flow away, because bore 23a, with energized magnet, is in communication via control slide 24 with return channels 28. In order to avoid this pressure-loss there is disposed in the bore 23a a valve seat 40, a ball 41 and a spring 42, jointly acting as a non-return valve, which closes off the bore 23a as a result of the higher pressure in bore 43.

The pressure control in dependence of the electric flux is furthermore fully identical to the pressure control shown in FIG. 1.

A pressure control device, as shown in FIG. 2, for instance is applied in a plastic injection moulding machine, and serves for the pressing out without pressure loss and for the bringing to full pressure of a hydraulic pressure cylinder. During injection of the plastic, said cylinder, however, has to give way at a specific pressure, oil behind the piston being forced out. During this part of the operation, the magnet 25 is energized, whereby dependent on the material to be processed, the pressure balance valve 1 is opened at a pressure set electrically, after which the oil can flow to the reservoir under pre-compression.

A pressure control device as shown in FIG. 2 can also function as a pressure counterbalance valve for providing counterpressure such as an electrically controlled sequence valve. Such a valve keeps the connection to a different part of the circuit with other consumers closed until in the main circuit a specific pressure prevails. By making the magnet at this pressure currentless, the interconnected system is fed without pressure drop.

A further variant of the pressure control device shown in FIG. 1 can be obtained by providing the pressure balance slide 4 in a slightly different form, in such a way that the slide 4, in the position wherein the pump-loaded end thereof presses against the retaining washer 13, brings the channels 8 and 5 in flow connection with each other. If now the port T is connected with the pump, and port P with the other control elements in the circuit, the pressure control device will function as a pressure reducing valve.

Such a pressure control device is used in a circuit wherein the feed is provided by a hydraulic pressure accumulator, or by a hydraulic pump with adjustable piston displacement, and which is furthermore provided with a constant pressure regulator mounted on the pump, which regulator adjusts the pump in such a way that this always provides just as much oil as is required for maintaining a constant maximum system pressure. Naturally, the control elements are of the type wherein all ports are closed in the midposition.

As soon as the magnet 25 of the pressure control device is energized, the spring 18 is compressed in a manner as earlier explained so that the pressure space 14 at the springloaded end of slide 4 is closed off from the channel 9. Via bores 6a and 6b, channel 5, throttle screw 11 and control bore 10, the pump pressure is propagated onto the springloaded side of pressure balance slide 4. As the two pressures on either side of the pressure balance slide are in equilibrium, the spring 12 will force the slide 4 to the right, thus opening the communication between channels 8 and 5.

If now the control valve controlling the consuming means is opened, the pressure in the pressure space 14 drops at the spring-loaded end of the slide 4, via the control channel 10 and the throttle screw 11, to the load pressure in channel 5, which is in communication via the control valve with the consuming means.

Because the pressure at the springloaded end of pressure balance slide 4 becomes lesser than at the pump-loaded end, the pressure balance slide 4 is pressed to the left, thus narrowing the throttle passage between channels 8 and 5. The movement to the left is maintained until, as a result of the oil stream passed through the throttle passage, the pressure drop in situ is such that the load pressure, together with the force of spring 12 at the springloaded end, is again equal to the pressure at the non-springloaded end. The main pressure is thus reduced to an intermediate pressure equal to the load pressure plus the tension of spring 12. When the load pressure increases to a value at which the spring tension of the control spring 18 is overcome, valve cone 19 is lifted from the seat 16, so that oil escapes via bore 17 of the valve seat 16 and via channel 9 to the reservoir. Thus the pressure at the springloaded side of the pressure balance slide 4 is kept constant and the higher pump pressure pushes the balance slide 4 fully to the left, thus shutting off the communication between the channels 8 and 5. Consequently, no oil is passed any longer to the circuit when the pressure set by means of the electrically controlled magnetic tension is attained.

Figure 4:
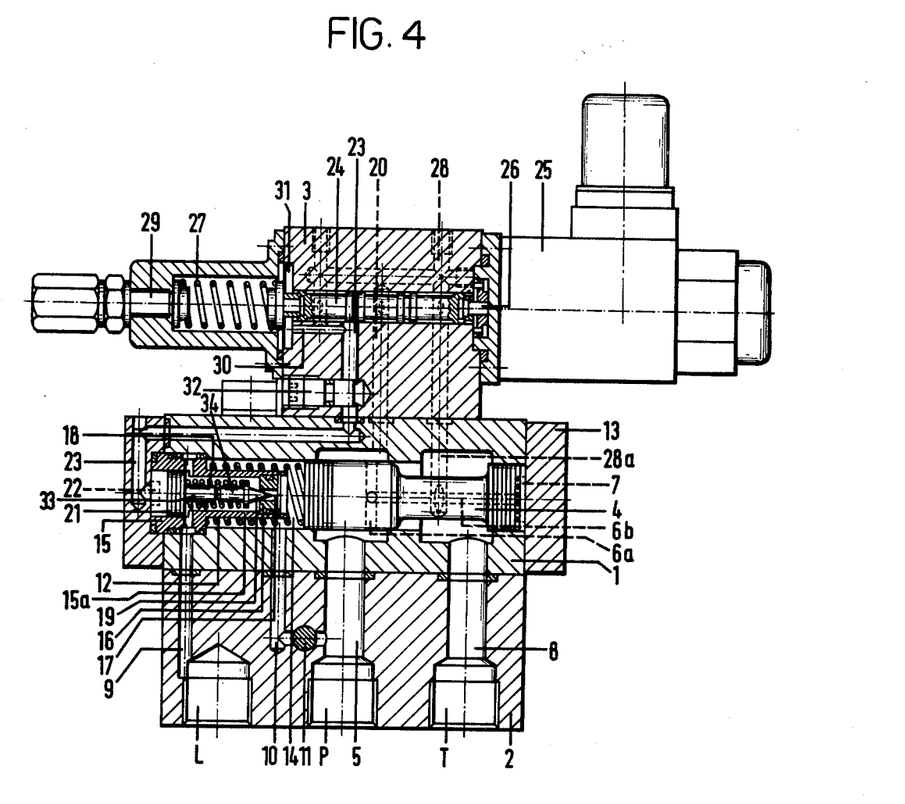
FIG. 4 shows a specific control position of the excess pressure valve in FIG. 1.
Figure 5:
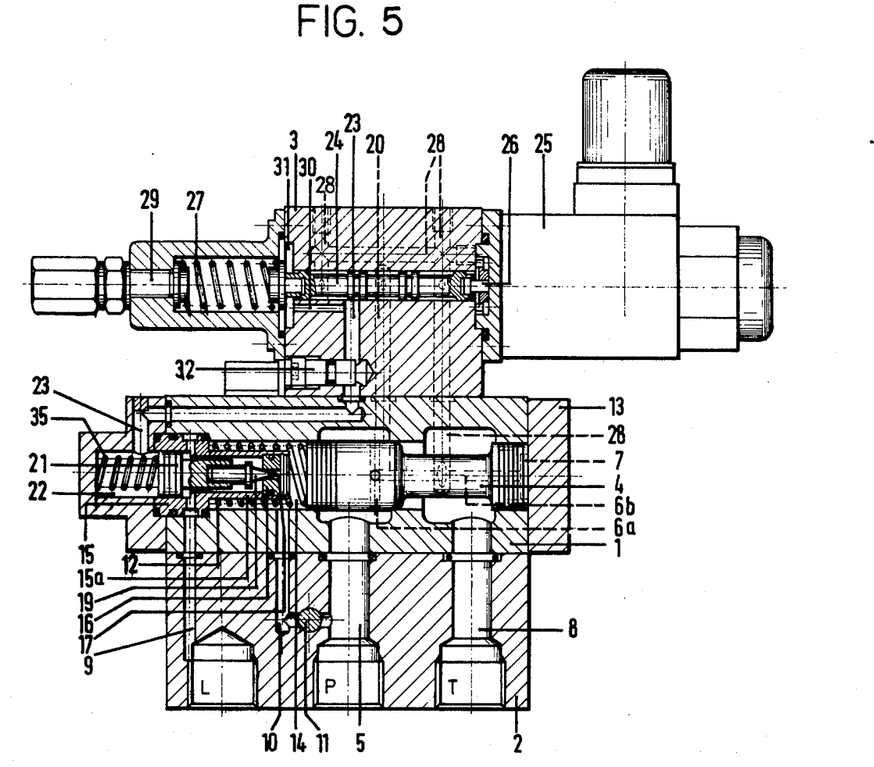
FIG. 5 shows a variant embodiment of the excess pressure valve relative to that shown in FIG. 1.

FIG. 4 shows the spring 18 in its maximally compressed condition, which condition is produced because the pins 33, 34, respectively, of the control plunger 21 and of the valve cone 19 contact one another. For higher maximal pressures to be set, the spring 18 does then no longer play an intermediary role, the maximum operating pressure set of the system being determined directly by the hydraulic pressure in the channel 23. The hydraulic pressure means themselves comprise both the spring pressure means and the spring pressure adjusting means. In cases wherein a spring 18 is deemed superfluous, one arrives, within the scope of the invention, at the construction of a pressure limiting valve cartridge 15 as shown in FIG. 5, the valve cone 19 forming a rigid whole with the control plunger 21. A spring 35, which may have a slight spring force, serves for retaining in position the control plunger 21 together with the valve cone 19 in specific conditions, such as for the purpose of assembly or for other situations wherein the hydraulic system is not operative as such.

I claim:

1. A pressure control device for sequentially setting a plurality of hydraulic pressures in a hydraulic supply line to a multi-cycle hydraulic consumer, comprising:
   A. A pressure balance valve which comprises:
      1. a central pump channel and a central return channel which are interconnected by a throttle passage, said pump channel being in hydraulic communication at pump pressure with a pump and with said hydraulic consumer and said return channel being in hydraulic communication with a reservoir for said pump,
      2. a pressure balance slide, which is adapted for sliding movement past said throttle passage to provide selective narrowing thereof between fully open and fully closed, comprising a spring-loaded end within a pressure space and a pump-loaded end,
      3. bore means for supplying hydraulic fluid at pump pressure to said pump-loaded end,
      4. bore means, having a throttle means therein, for supplying hydraulic fluid at a selected rate of flow to said pressure space; and
      5. a light spring which is adapted to exert pressure upon said spring-loaded end;
   B. a pressure-limiting valve assembly which comprises:
      1. a housing, disposed in said pressure space, which is in axial alignment with said pressure balance slide and comprises an interior space in hydraulic communication with said reservoir, 2. a valve seat in said housing, having an adjusting bore therein which provides hydraulic communication between said pressure space and said interior space,
  3. valve means adapted to press onto said seat and selectively close said adjusting bore, whereby the rate of flow of hydraulic fluid through said adjusting bore is selectively adjustable in relation to said selected rate of flow of hydraulic fluid through said throttle means,
  4. a control plunger, having a pressure chamber at one end thereof, which is connected to said valve means within said interior space and is adapted to be moved axially toward said seat by pressure in said pressure chamber; and
C. an electrically controlled pressure-setting means which comprises:
  1. a pressure control slide, having a pressure end and an armature end, which is axially slideable within a pressure control cylinder,
  2. control bore means providing hydraulic communication between said pressure chamber and said pressure control cylinder,
  3. feed bore means providing pressurized hydraulic fluid to said pressure control cylinder,
  4. return bore means providing hydraulic communication between said pressure control cylinder and said reservoir,
  5. a control spring providing spring pressure upon said pressure end,
  6. an armature attached to said armature end, and
  7. an electric magnet which provides a selected magnetic flux, when energized by a selected electrical current, that moves said armature towards said control spring to establish hydraulic communication between said control bore means and said feed bore means and that, when unenergized, permits said armature to be moved by said control spring to establish hydraulic communication between said control bore means and said return bore means, whereby pressure is reduced in said pressure chamber and flow occurs through said adjusting bore.

2. The pressure control device of claim 1 wherein said control plunger and said valve means are connected with a spring.

3. The pressure control device of claim 1 wherein said bore means supplying hydraulic fluid to said pump-loaded end is connected to said pump channel.

4. The pressure control device of claim 3 wherein said bore means passes through said pressure balance slide.

5. The pressure control device of claim 4 wherein said bore means comprises, within said pressure balance slide, a radially disposed bore and an axially disposed bore which are mutually interconnected.

6. The pressure control device of claim 1 wherein said bore means supplying hydraulic fluid to said pump-loaded end is connected directly to said pump.

7. The pressure control device of claim 1 wherein said control bore means comprises a throttle means, whereby the switching speed of said control plunger can be set.

8. The pressure control device of claim 1 wherein said control bore means is in hydraulic communication with said pressure end of said pressure control slide, whereby pressurized hydraulic fluid augments the force exerted by said control spring.

9. The pressure control device of claim 1 wherein said feed bore means is connected to said pump channel.

10. The pressure control device of claim 1 wherein said feed bore means is connected to said pump.

11. In a pressure-control device for selectively setting a maximum operating pressure in a hydraulic circuit in which said device includes:

a pressure balance valve, having a pressure-balance slide controlling a throttle passage interconnecting a pump channel and a return channel to the reservoir for said pump, said slide being moved to open said passage by balance pressure at one end thereof, and a pressure-limiting valve assembly, having a control plunger pressurized at one end thereof by an electrically reduced pressure fed through a control bore, said plunger being moved to open an auxilliary bore for lowering said balance pressure when said electrically reduced pressure is insufficient, the improvement comprising the formation of said electrically reduced pressure in said control bore by movement of a two-way control slide which:
  A. operates between a feed bore, said control bore, and a return bore to said reservoir by means of an electric magnet moving an armature in response to a selected electrical current, said control bore having no other outlet than said return bore;
  B. is loaded at one end thereof by said electrically reduced pressure; and
  C. is attached at the other end thereof to said armature.

* * * * *

UNITED STATES PATENT OFFICE
CERTIFICATE OF CORRECTION

Patent No. 3,884,262　　　　　　　　　　Dated May 20, 1975

Inventor(s) Carl J. Assembergs

It is certified that error appears in the above-identified patent and that said Letters Patent are hereby corrected as shown below:

Column 1, line 47 delete "two required magnet valves" and insert --required two magnet valves--.

Column 2, line 67, delete "become" and insert --because--.

Column 3, line 31-33, delete "on the control plunger 21 and a pin 34 is attached to the valve cone 19" and insert --a pin 33 is attached to the control plunger 21, and a pin 54 is attached to the valve cone 19--.

Column 3, line 45, after "slide 24" insert --which is axially--.

Column 4, line 58, insert --control slide 24-- after "the".

Signed and Sealed this ninth Day of March 1976

[SEAL]

Attest:

RUTH C. MASON
*Attesting Officer*

C. MARSHALL DANN
*Commissioner of Patents and Trademarks*